US010377891B2

(12) United States Patent
Chen et al.

(10) Patent No.: US 10,377,891 B2
(45) Date of Patent: *Aug. 13, 2019

(54) BLENDS OF POLY(VINYL ACETAL) RESINS FOR COMPOSITIONS, LAYERS, AND INTERLAYERS HAVING ENHANCED OPTICAL PROPERTIES

(71) Applicant: SOLUTIA INC., St. Louis, MO (US)

(72) Inventors: Wenjie Chen, Amherst, MA (US); John Joseph D'Errico, Glastonbury, CT (US); Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,819

(22) Filed: Jun. 22, 2018

(65) Prior Publication Data

US 2018/0298180 A1 Oct. 18, 2018

Related U.S. Application Data

(63) Continuation of application No. 14/562,832, filed on Dec. 8, 2014, now Pat. No. 10,005,899.

(51) Int. Cl.
| | | |
|---|---|---|
| C08L 29/14 | (2006.01) | |
| C08K 5/103 | (2006.01) | |
| C08K 5/12 | (2006.01) | |
| B32B 17/10 | (2006.01) | |

(52) U.S. Cl.
CPC ........ *C08L 29/14* (2013.01); *B32B 17/10761* (2013.01); *C08K 5/103* (2013.01); *C08K 5/12* (2013.01); *B32B 2307/102* (2013.01); *C08L 2205/025* (2013.01); *C08L 2205/03* (2013.01)

(58) Field of Classification Search
CPC .................................. C08L 29/14; C08K 5/12
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 5,137,954 A | 8/1992 | DasGupta et al. | |
| 5,190,826 A | 3/1993 | Asahina et al. | |
| 5,290,660 A | 3/1994 | Eian et al. | |
| 5,728,472 A | 3/1998 | D'Errico | |
| 6,187,845 B1 | 2/2001 | Renz et al. | |
| 6,506,835 B1 | 1/2003 | Hofmann | |
| 6,887,577 B1 | 5/2005 | Keller | |
| 6,982,296 B2 | 1/2006 | Keller et al. | |
| 7,510,771 B2 | 3/2009 | Lu | |
| 8,431,047 B2 | 4/2013 | Ootsuki et al. | |
| 9,023,930 B2 | 5/2015 | Ootsuki | |
| 9,248,626 B2 * | 2/2016 | Lu | B32B 7/02 |
| 9,636,894 B2 | 5/2017 | Lu | |
| 9,840,617 B2 * | 12/2017 | Lu | C08L 29/14 |
| 10,005,899 B2 | 6/2018 | Chen et al. | |
| 10,125,253 B2 | 11/2018 | Lu | |
| 2003/0139520 A1 | 7/2003 | Toyama | |
| 2004/0065229 A1 | 4/2004 | Papenfuhs et al. | |
| 2005/0049341 A1 * | 3/2005 | Grass | C08J 9/0014 524/306 |
| 2008/0268270 A1 | 10/2008 | Chen et al. | |
| 2010/0206374 A1 | 8/2010 | Karpinski et al. | |
| 2013/0022824 A1 | 1/2013 | Meise et al. | |
| 2013/0075949 A1 | 3/2013 | Chen et al. | |
| 2014/0138580 A1 | 5/2014 | Mizumura et al. | |
| 2014/0364550 A1 * | 12/2014 | Lu | B32B 7/02 524/299 |
| 2016/0053102 A1 | 2/2016 | Asanuma et al. | |
| 2016/0096349 A1 | 4/2016 | Lu | |
| 2016/0111077 A1 | 4/2016 | Lu | |
| 2016/0160022 A1 | 6/2016 | Lu | |

FOREIGN PATENT DOCUMENTS

| | | |
|---|---|---|
| WO | WO 2010108975 A1 | 9/2010 |
| WO | WO 2014/148360 A1 | 9/2014 |
| WO | WO 2014/200993 A1 | 12/2014 |

OTHER PUBLICATIONS

USPTO Notice of Allowance dated Jul. 30, 2018 in co-pending U.S. Appl. No. 16/015,819.
USPTO Notice of Allowance dated Oct. 4, 2018 in co-pending U.S. Appl. No. 15/834,603.
Co-pending U.S. Appl. No. 16/169,409, filed Oct. 24, 2018, Jun Lu.
ASTM International Designation: D1003-13; "Standard Test Method for Haze and Luminous Transmittance of Transparent Plastics"; Nov. 2013.
ASTM International Designation: D1396-94 (Reapproved 1998); Standard Test Methods for Chemical Analysis of Poly(Vinyl Butyral); Jul. 1992.
Bendaoud, Amine et al.; Blends of Plasticized Polyvinyl Butyral and Polyvinyl Chloride: Morphology Analysis in View of Recycling; Macromolecular Materials and Engineering Journal, 298; pp. 1259-1268; 2013.
Piirma, I; "Polymeric Surfactants"; Surfactant Science Series, vol. 42, p. 221; 1992.
Wade, B. E.; "Vinyl Acetal Polymers"; Encyclopedia of Polymer Science & Technology, 3d Edition, vol. 8, pp. 381-399; 2003.
Co-pending U.S. Appl. No. 14/527,745 filed Oct. 29, 2014, Wenjie Chen; now U. S. Publication 2016/0122526.
Office Action dated Jul. 10, 2017 received in co-pending U.S. Appl. No. 14/527,745.

(Continued)

*Primary Examiner* — Rip A Lee

(74) *Attorney, Agent, or Firm* — Steven A. Owen; Michelle Bugbee

(57) ABSTRACT

Resin compositions, layers, and interlayers comprising two or more poly(vinyl acetal) resins and at least one blending agent or haze reducing agent are provided. Such compositions, layers, and interlayers exhibit enhanced optical properties while retaining other properties, such as impact resistance and acoustic performance.

7 Claims, No Drawings

(56) References Cited

OTHER PUBLICATIONS

Notice of Allowance dated Nov. 8, 2017 received in co-pending U.S. Appl. No. 14/527,745.
Co-pending U.S. Appl. No. 15/839,990, filed Dec. 13, 2017; Wenjie Chen.
Co-pending U.S. Appl. No. 14/562,829, filed Dec. 8, 2014, Jun Lu; now U.S. Pat. No. 9,840,617.
Office Action dated May 12, 2017 received in co-pending U.S. Appl. No. 14/562,829.
Co-pending U.S. Appl. No. 14/562,832, filed Dec. 8, 2014, Wenjie Chen et al.; now U. S. Patent 10005899.
USPTO Office Communication received in co-pending U.S. Appl. No. 14/562,832 notification date Jul. 10, 2015.
USPTO Office Communication received in co-pending U.S. Appl. No. 14/562,832 notification date Jan. 25, 2016.
Office Action dated Feb. 1, 2017 received in co-pending U.S. Appl. No. 14/562,832.
Notification of Transmittal of the International Search Report and the Written Opinion of the International Searching Authority, or the Declaration dated Feb. 3, 2016 received in International Application No. PCT/US2015/056857.
Notification of Transmittal of the International Search Report and the Written Opinion of the International Searching Authority, or the Declaration dated Mar. 11, 2016 received in International Application No. PCT/US2015/063879.
Office Action dated Jul. 7, 2017 received in co-pending U.S. Appl. No. 14/562,832.
USPTO Notice of Allowance dated Oct. 20, 2017 in co-pending U.S. Appl. No. 14/562,829.
Office Action dated Nov. 29, 2017 received in co-pending U.S. Appl. No. 14/562,832.
Co-pending U.S. Appl. No. 15/834,603, filed Dec. 7, 2017, Jun Lu.
Office Action dated Apr. 27, 2018 received in co-pending U.S. Appl. No. 15/834,603.
USPTO Notice of Allowance dated May 15, 2018 in co-pending U.S. Appl. No. 14/562,832.
USPTO Office Communication received in co-pending U.S. Appl. No. 15/839,990, notification date Feb. 13, 2019.

* cited by examiner

BLENDS OF POLY(VINYL ACETAL) RESINS FOR COMPOSITIONS, LAYERS, AND INTERLAYERS HAVING ENHANCED OPTICAL PROPERTIES

CROSS REFERENCE TO RELATED APPLICATIONS

This application is a continuation of U.S. application Ser. No. 14/562,832 filed on Dec. 8, 2014, now granted as a U.S. Pat. No. 10,005,899, the disclosures of which are herein incorporated by reference in their entirety to the extent they do not contradict the statements herein.

BACKGROUND

1. Field of the Invention

This disclosure relates to polymer resins and, in particular, to polymer resins suitable for use in polymer interlayers, including those utilized in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

The term "safety glass" generally refers to a transparent laminate that includes at least one polymer sheet, or interlayer, disposed between two sheets of glass. Safety glass is often used as a transparent barrier in architectural and automotive applications, and one of its primary functions is to absorb energy resulting from impact or a blow without allowing the object to penetrate the glass. Additionally, even when the applied force is sufficient to break the glass, the polymeric interlayer helps keep the glass bonded to the laminate, which prevents dispersion of sharp glass shards, thereby minimizing injury and damage to people or objects within the interior space. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable acoustic properties has also been produced, which results in quieter internal spaces.

Often, polymers that exhibit one set of desirable properties, such as acoustic performance, lack other desirable properties, such as impact resistance or strength. Therefore, in order to achieve certain combinations of properties, multilayered polymer interlayers have been used. These multilayered interlayers may include at least one inner "core" layer sandwiched between two outer "skin" layers. Often, the core layer of an interlayer may be a softer layer having a lower glass transition temperature, which enhances its acoustic performance. However, because such resin layers can be difficult to easily process and/or transport, the skin layers of such multilayered interlayers are often stiffer and have higher glass transition temperatures, which imparts enhanced processability, strength, and impact resistance to the interlayer. In some cases, the outer layers may be formed from the lower glass transition materials, with the inner core layer being the stiffer layer.

At times, use of various resins having different properties can also produce optical defects within the interlayer. For example, one defect common to these types of compositions, layers, and interlayers is mottle. Mottle is an objectionable form of optical distortion or visual defect appearing as uneven spots or texture, usually in the final structure. Mottle is caused by small-scale surface variations at the interfaces between the soft and stiff layers wherein the individual layers have different refractive indices. Clarity is another important optical property that is determined by measuring the level of haze within the composition, layer, or interlayer. High haze typically occurs when different types of optically incompatible polymers and/or plasticizers are blended or mixed together. In such mixtures, light passing through the blend is scattered as it encounters regions of different polymer materials, and the result is a hazy, visually unclear appearance. High clarity polymers and interlayers are those having very low haze values.

Thus, a need exists for polymer resin compositions, resin layers, and interlayers formed from blends of poly(vinyl acetal) resins that have different compositions, but that exhibit desirable optical properties. Additionally, such compositions, layers, and interlayers should be produced without sacrificing mechanical and acoustic performance of the final product and should be usable in a wide variety of end use applications, including as automotive and architectural multiple layer panels.

SUMMARY

One embodiment of the present invention concerns a mixed resin composition comprising a first poly(vinyl acetal) resin, a second poly(vinyl acetal) resin, and a haze reducing agent. The residual hydroxyl content and/or the residual acetate content of the second poly(vinyl acetal) resin is at least 2 weight percent higher or lower than the residual hydroxyl content and/or residual acetate content of the first poly(vinyl acetal) resin, and the second poly(vinyl acetal) resin is present in the resin composition in an amount of at least 0.3 weight percent, based on the total weight of the first and the second poly(vinyl acetal) resins. The haze reducing agent has at least one moiety having a higher affinity for the first poly(vinyl acetal) resin than for the second poly(vinyl acetal) resin and at least one other moiety having a higher affinity for the second poly(vinyl acetal) resin than for the first poly(vinyl acetal) resin, wherein the haze reducing agent is present in the composition in an amount in the range of from 0.25 to 20 weight percent, based on the total weight of the composition.

Another embodiment of the present invention concerns an interlayer comprising a resin layer comprising a first poly (vinyl acetal) resin, a second poly(vinyl acetal) resin, and a haze reducing agent. The second poly(vinyl acetal) resin is present in the resin layer in an amount of at least 0.3 weight percent, based on the combined weight of the first and the second poly(vinyl acetal) resins; and the resin layer has an HLD haze value that is at least 5 percent lower than the HLD haze value of an identical resin layer that does not include the haze reducing agent.

Yet another embodiment of the present invention concerns a method for producing an interlayer, the method comprising the steps of providing a first poly(vinyl acetal) resin, a second poly(vinyl acetal) resin, and a haze reducing agent; and blending the first poly(vinyl acetal) resin, the second poly(vinyl acetal) resin, and the haze reducing agent to form a blended resin composition; and forming an interlayer from the resin composition, wherein the interlayer has an HLD haze value that is at least 5 percent lower than the HLD haze value of an identical interlayer that does not include the haze reducing agent.

DETAILED DESCRIPTION

Resin compositions, layers, and interlayers are provided according to various embodiments of the present invention that exhibit improved optical properties. In particular, the resin compositions, layers, and interlayers described herein include at least two poly(vinyl acetal) resins and at least one blending agent or haze reducing agent for improving the compatibility of typically incompatible resins. When blended in the absence of a haze reducing agent or a blending agent as described herein, the poly(vinyl acetal) resins having different compositions may provide compositions, layers, and interlayers that exhibit increased haze and reduced clarity that may be unsuitable for many end use applications, including automotive and architectural applications. However, inclusion of blending agents or haze reducing agents as described according to various embodiments herein may result in compositions, layers, or interlayers having enhanced optical properties and that can be used in a wide variety of applications, including multiple layer panels for automotive and/or architectural applications.

The present invention generally relates to polymer resin compositions, as well as polymer resin layers and interlayers including the same. As used herein, the terms "polymer resin composition" and "resin composition" refer to compositions including two or more polymer resins. Polymer compositions may optionally include other components, such as plasticizers and/or other additives. As used herein, the terms "polymer resin layer" and "resin layer" refer to two or more polymer resins, optionally combined with one or more plasticizers, that have been formed into a polymeric sheet. Again, resin layers can include additional additives, although these are not required. As used herein, the term "interlayer" refers to a single or multiple layer polymer sheet suitable for use with at least one rigid substrate to form a multiple layer panel. The terms "single-sheet" interlayer and "monolithic" interlayer refer to interlayers formed of one single resin sheet, while the terms "multiple layer" and "multilayer" interlayer refer to interlayers having two or more resin sheets coextruded, laminated, or otherwise coupled to one another.

Resin compositions, layers, and interlayers according to various embodiments of the present invention can include at least two poly(vinyl acetal) resins. Poly(vinyl acetal) resins can be formed by acetalization of poly(vinyl alcohol) with one or more aldehydes in the presence of an acid catalyst. The resulting resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, 3$^{rd}$ ed., Volume 8, pages 381-399, by B. E. Wade (2003). The total amount of residual aldehyde groups, or residues, present in the resulting poly(vinyl acetal) resin can be at least about 50, at least about 60, at least about 70, at least about 75, at least about 80, at least about 85 weight percent, as measured by ASTM D-1396. The total amount of aldehyde residues in a poly(vinyl acetal) resin can be collectively referred to as the acetal component, with the balance of the poly(vinyl acetal) resin comprising residual hydroxyl and residual acetate groups, which will be discussed in further detail below.

In some embodiments, the poly(vinyl acetal) resin can comprise a poly(vinyl n-butyral) (PVB) resin. The acetal component of a poly(vinyl n-butyral) resin can include primarily residues of n-butyraldehyde and may, for example, comprise at least about 50, at least about 60, at least about 70, at least about 80, at least about 90, at least about 95, at least about 97, or at least about 99 percent of residues of n-butyraldehyde, based on the total weight of aldehyde residues of the resin. Additionally, a poly(vinyl n-butyral) resin may comprise not more than about 50, not more than about 40, not more than about 30, not more than about 20, not more than about 15, not more than about 10, not more than about 5, not more than about 2, not more than about 1, or not more than about 0.5 weight percent of residues of an aldehyde other than n-butyraldehyde, based on the total weight of aldehyde residues of that resin.

One or more poly(vinyl acetal) resins may also include residues of one or more aldehydes other than n-butyraldehyde. For example, in some embodiments, at least one poly(vinyl acetal) resin in the composition, layer, or interlayer can include residues of at least one other $C_4$ to $C_8$ aldehyde, including, for example, iso-butyraldehyde, 2-methylvaleraldehyde, n-hexyl aldehyde, 2-ethylhexyl aldehyde, n-octyl aldehyde, and combinations thereof. In some embodiments, at least one poly(vinyl acetal) resin may include one or more $C_4$ to $C_8$ aldehydes selected from the group consisting of iso-butyraldehyde, 2-ethylhexyl aldehyde, and combinations thereof. In various embodiments, at least one poly(vinyl acetal) resin can include zero weight percent, or can include at least about 1, at least about 5, at least about 10, at least about 20, at least about 30, at least about 40 and/or not more than about 80, not more than about 70, not more than about 60, not more than about 50, not more than about 40 weight percent, or about 0 to about 40, about 0 to about 30, about 0 to about 20, about 1 to about 80, about 5 to about 70, about 10 to about 60 weight percent of one or more aldehydes other than n-butyraldehyde.

In some embodiments, the resin composition, layer, or interlayer can include at least a first poly(vinyl acetal) resin and a second poly(vinyl acetal) resin, each of which may be present in the composition, layer, or interlayer in an amount of at least about 0.10, at least about 0.50, at least about 1, at least about 1.5, at least about 2, at least about 2.5, at least about 3, at least about 3.5, at least about 5, at least about 10, at least about 15, at least about 20, at least about 30, at least about 40, or at least about 45 weight percent, based on the combined weight of all resins in the composition, layer, or interlayer. Together, the first and second poly(vinyl acetal) resins can make up at least about 10, at least about 20, at least about 30, at least about 40, at least about 50, at least about 60, at least about 70, or at least about 80 weight percent of all resins in the composition, layer, or interlayer. In some embodiments, the amount of resins other than the first and second poly(vinyl acetal) resins can be not more than about 20, not more than about 15, not more than about 10, not more than about 5, not more than about 2, or not more than about 1 weight percent, based on the combined weight of all resins.

The first and second poly(vinyl acetal) resin can be present in the composition in nearly the same amounts, or one of the first and second poly(vinyl acetal) resins can be present in a higher amount than the other. For example, in some embodiments, one of the first and second poly(vinyl acetal) resins can be present in an amount of at least about 0.5, at least about 1, at least about 5, at least about 10, at least about 15, at least about 20, at least about 30 and/or not more than about 99.5, not more than about 90, not more than about 85, not more than about 80, not more than about 70, not more than about 60, not more than about 50, not more than about 40, not more than about 30, not more than about 20 weight percent, or in the range of from about 0.5 to about 99.5, about 10 to about 90, or about 30 to about 60 weight percent, based on the combined weight of the first and the second poly(vinyl acetal) resins.

In some embodiments, one of the first and the second poly(vinyl acetal) resins can be present in the composition, layer, or interlayer in an amount of less than 12 weight percent, based on the combined weight of the first and second poly(vinyl acetal) resins. For example, the first or the second poly(vinyl acetal) resin can be present in the composition, layer, or interlayer in an amount of at least about 0.3, at least about 0.5, at least about 1, at least about 1.5, at least about 2, at least about 2.5, at least about 3, at least about 3.5, at least about 4, at least about 4.5, at least about 5, at least about 5.5, at least about 6, at least about 6.5, at least about 7 weight percent and/or not more than about 12, not more than about 11.5, not more than about 11, not more than about 10.5, not more than about 10, not more than about 9.5, not more than about 9, not more than about 8.5, not more than about 8, not more than about 7.5, or not more than about 5 weight percent, based on the combined weight of the first and second poly(vinyl acetal) resins. In some embodiments, one of the first and second poly(vinyl acetal) resins can be present in the composition, layer, or interlayer in an amount in the range of from about 0.5 to about 12, about 1 to about 10, about 1.5 to about 7.5, about 2.5 to about 5 weight percent, based on the combined weight of the first and second poly(vinyl acetal) resins.

The ratio, by weight, of one of the first and second poly(vinyl acetal) resin to the other can be at least about 0.3:99.7, at least about 0.5:99.5, at least about 1:99, at least about 5:95, at least about 10:90, at least about 15:85, at least about 20:80, at least about 25:75, at least about 40:60 and/or not more than about 99.7:0.3, not more than about 99.5:0.5, not more than about 99:1, not more than about 95:5, not more than about 90:10, not more than about 85:15, not more than about 80:20, not more than about 75:25, not more than about 60:40, or in the range of from about 0.3:99.7 to 99.7:0.3, about 10:90 to 90:10, about 25:75 to about 75:25, or about 40:60 to 60:40.

In some embodiments, the resin composition, layer, or interlayer may include at least a first poly(vinyl acetal) resin, a second poly(vinyl acetal) resin, and a third poly(vinyl acetal) resin. According to these embodiments, the first, second, and/or third poly(vinyl acetal) resins can be present in the composition, layer, or interlayer in substantially the same amount, or one or more of the poly(vinyl acetal) resins may be present in an amount different than one or more of the other poly(vinyl acetal) resins. At least one, at least two, or each of the three poly(vinyl acetal) resins may be present in the composition, layer, or interlayer in an amount of at least about 0.10, at least about 0.50, at least about 1, at least about 2, at least about 3, at least about 5, at least about 10, at least about 15, at least about 20, at least about 30, at least about 40, or at least about 45 weight percent, based on the combined weight of all resins in the composition, layer, or interlayer. Together, the first, second, and third poly(vinyl acetal) resins can make up at least about 10, at least about 20, at least about 30, at least about 40, at least about 50, at least about 60, at least about 70, or at least about 80 weight percent of the resins in the composition, layer, or interlayer. In some embodiments, the amount of resins other than the first, second, and third poly(vinyl acetal) resins in the composition, layer, or interlayer can be not more than about 20, not more than about 15, not more than about 10, not more than about 5, not more than about 2, or not more than about 1 weight percent.

The first, second, and third poly(vinyl acetal) resins can be present in the composition in nearly the same amounts, or at least one of the first, second, and third poly(vinyl acetal) resins can be present in a higher amount than one or more of the others. For example, in some embodiments, at least one of the first, second, and third poly(vinyl acetal) resins can be present in an amount of at least about 0.3, at least about 0.5, at least about 1, at least about 5, at least about 10, at least about 15, at least about 20, at least about 30 and/or not more than about 99.7, not more than about 99.5, not more than about 90, not more than about 85, not more than about 80, not more than about 70, not more than about 60, not more than about 50, not more than about 40, not more than about 30, not more than about 20 weight percent, or in the range of from about 0.3 to about 99.7, about 10 to about 90, or about 30 to about 60 weight percent, based on the combined weight of the first, second, and third poly(vinyl acetal) resins.

The ratio, by weight, of one of the first, second, and third poly(vinyl acetal) resin to one or both of the others can be at least about 0.3:99.7, at least about 1:99, at least about 5:95, at least about 10:90, at least about 15:85, at least about 20:80, at least about 25:75, at least about 40:60 and/or not more than about 99.5:0.5, not more than about 99:1, not more than about 95:5, not more than about 90:10, not more than about 85:15, not more than about 80:20, not more than about 75:25, not more than about 60:40, or in the range of from about 0.3:99.7 to 99.7:0.3, about 10:90 to 90:10, about 25:75 to about 75:25, or about 40:60 to 60:40.

According to some embodiments, the first and second poly(vinyl acetal) resins present in the composition, layer, or interlayer may be blended such that one of the first and second resins is dispersed within the other of the first and second resins, which can form domains of one of the first and second poly(vinyl acetal) resins within the other. Such a blended resin may be used as a single layer interlayer or it may be combined with one or more adjacent layers to form a multilayer interlayer. In other embodiments, the first and second poly(vinyl acetal) resins can be present in adjacent layers of a multilayer interlayer, such that one of the layers of the interlayer includes the first poly(vinyl acetal) resin and another layer of the interlayer includes the second poly(vinyl acetal) resin. Additional layers can also be present in the multilayer interlayer according to various embodiments of the present invention.

The resin compositions, layers, and interlayers according to various embodiments of the present invention can further include at least one plasticizer. Depending on the specific composition of the resin or resins in a composition, layer, or interlayer, the plasticizer may be present in an amount of at least about 5, at least about 10, at least about 15, at least about 20, at least about 25, at least about 30, at least about 35, at least about 40, at least about 45, at least about 50, at least about 55, at least about 60 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of all resins present to determine the parts per hundred resin. Further, when the plasticizer content of a layer or interlayer is provided herein, it is provided with reference to the amount of plasticizer in the mix or melt that was used to produce the layer or interlayer.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyl adipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate) and tetraethylene glycol di-(2-ethylhexanoate), or the plasticizer can comprise triethylene glycol di-(2-ethylhexanoate).

According to some embodiments, the first and second poly(vinyl acetal) resins in the compositions, layers, and interlayers described herein can have different compositions. Typically, such differences in composition between the first and second poly(vinyl acetal) resins result in undesirable optical properties, such as increased haze and reduced clarity, when the resins are combined in a composition, layer, or interlayer. However, as discussed in further detail below, inclusion of at least one haze reducing agent or blending agent in accordance with embodiments of the present invention results in compositions, layers, and interlayers including such resin blends that exhibit enhanced clarity.

According to some embodiments, the first and second poly(vinyl acetal) resins may have different amounts of residual hydroxyl and/or acetate groups incorporated into the polymer backbone. As used herein, the terms "residual hydroxyl content" and "residual acetate content" refer to the amount of hydroxyl and acetate groups, respectively, that remain on a resin after processing is complete. For example, polyvinyl n-butyral can be produced by hydrolyzing polyvinyl acetate to polyvinyl alcohol, and then acetalizing the polyvinyl alcohol with n-butyraldehyde to form polyvinyl n-butyral. In the process of hydrolyzing the polyvinyl acetate, not all of the acetate groups are converted to hydroxyl groups, and residual acetate groups remain on the resin. Similarly, in the process of acetalizing the polyvinyl alcohol, not all of the hydroxyl groups are converted to acetal groups, which also leaves residual hydroxyl groups on the resin. As a result, most poly(vinyl acetal) resins include both residual hydroxyl groups (as vinyl alcohol groups) and residual acetate groups (as vinyl acetate groups) as part of the polymer chain. The residual hydroxyl content and residual acetate content are expressed in weight percent, based on the weight of the polymer resin, and are measured according to ASTM D-1396.

The difference between the residual hydroxyl content of the first and second poly(vinyl acetal) resins used in compositions, layers, and interlayers according to various embodiments of the present invention could also be at least about 2, at least about 3, at least about 4, at least about 6, at least about 8, at least about 10, at least about 12, at least about 15, at least about 20, or at least about 30 weight percent. As used herein, the terms "weight percent different" and "the difference is at least weight percent" refer to a difference between two given weight percentages, calculated by subtracting one number from the other number. For example, a poly(vinyl acetal) resin having a residual hydroxyl content of 12 weight percent and a poly(vinyl acetal) resin having a residual hydroxyl content of 14 weight percent are 2 weight percent different from one another. As used herein, the term "different" encompasses values that are both higher and lower than another value.

In some embodiments, at least one of the first and second poly(vinyl acetal) resins can have a residual hydroxyl content of at least about 14, at least about 14.5, at least about 15, at least about 15.5, at least about 16, at least about 16.5, at least about 17, at least about 17.5, at least about 18, at least about 18.5, at least about 19, at least about 19.5 and/or not more than about 45, not more than about 40, not more than about 35, not more than about 33, not more than about 30, not more than about 27, not more than about 25, not more than about 22, not more than about 21.5, not more than about 21, not more than about 20.5, or not more than about 20 weight percent, or in the range of from about 14 to about 45, about 16 to about 30, about 18 to about 25, about 18.5 to about 20, or about 19.5 to about 21 weight percent.

The other poly(vinyl acetal) resin can have a residual hydroxyl content of at least about 8, at least about 9, at least about 10, at least about 11 weight percent and/or not more than about 16, not more than about 14.5, not more than about 13, not more than about 11.5, not more than about 11, not more than about 10.5, not more than about 10, not more than about 9.5, or not more than about 9 weight percent, or in the range of from about 8 to about 16, about 9 to about 15, or about 9.5 to about 14.5 weight percent. As mentioned previously, the poly(vinyl acetal) resins may be selected such that the difference between the residua hydroxyl content of one or more of the resins is at least about 2 weight percent different than the residual hydroxyl content of one or more other resins in the composition, layer, or interlayer.

One or more other poly(vinyl acetal) resins may also be present in the resin composition, layer, or interlayer and can have a residual hydroxyl within the ranges provided above. Additionally, the residual hydroxyl content of the one or more other poly(vinyl acetal) resins in the composition, layer, or interlayer can be the same as or different than the residual hydroxyl content of the first and/or second poly (vinyl acetal) resins.

In some embodiments, the first poly(vinyl acetal) resin can have a residual acetate content that is at least about 2, at least about 3, at least about 4, at least about 5, at least about 6, or at least about 8, at least about 10, at least about 12, at least about 15, at least about 20, or at least about 30 weight percent higher or lower than the residual acetate content of the second poly(vinyl acetal) resin. In other embodiments, the first poly(vinyl acetal) resin can have a residual acetate content that is not more than about 5, not more than about 4, not more than about 3, not more than about 2, not more than about 1, or not more than about 0.5 weight percent higher or lower than the residual acetate content of the second poly(vinyl acetal) resin. At least one of the first and second poly(vinyl acetal) resins can have a residual acetate content of not more than about 4, not more than about 3, not more than about 2, or not more than about 1 weight percent, while, in other embodiments, at least one of the first and second poly(vinyl acetal) resins can have a residual acetate content of at least about 5, at least about 8, at least about 10, at least about 12, at least about 14, at least about 16, at least about 18, at least about 20, or at least about 30 weight percent. Additional poly(vinyl acetal) resins present in the resin composition or interlayer can have a residual acetate content the same as or different than the residual acetate content of the first and/or second poly(vinyl acetal) resin, and the value may fall in one or more of the ranges above.

In various embodiments, the differences in residual hydroxyl and/or residual acetate content of the first and second poly(vinyl acetal) resins can be selected to control or provide certain performance properties, such as strength, impact resistance, penetration resistance, processability, or acoustic performance to the final composition, layer, or interlayer. For example, poly(vinyl acetal) resins having a higher residual hydroxyl content, such as, for example, those greater than about 16 weight percent, can facilitate increased impact resistance, penetration resistance, and strength to a resin composition or layer, while lower hydroxyl content resins, such as, for example, those having a residual hydroxyl content of less than 13 weight percent, can improve the acoustic performance of the interlayer or blend.

Poly(vinyl acetal) resins having higher or lower residual hydroxyl contents and/or residual acetate contents, when combined with at least one plasticizer, may ultimately include different amounts of plasticizer. As a result, layers or domains formed of first and second poly(vinyl acetal) resins having different compositions may also have different properties within a single resin layer or interlayer. Although not wishing to be bound by theory, it is understood that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, these trends could be reversed.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In some embodiments, two or more resin layers or interlayers can be blended to thereby form new resin layers or interlayers having unexpected properties and performance attributes. For example, a resin layer or interlayer having lower residual hydroxyl content and lower glass transition temperature may be blended with another resin layer or interlayer having higher residual hydroxyl content and higher glass transition temperature, resulting a new resin layer or interlayer having soft domains of lower glass transition temperature, which enhances its acoustic performance, and stiff domains of higher glass transition temperature, which imparts enhanced processability, strength, and impact resistance to the resin layer or interlayer. In other embodiments, a single sheet interlayer can be blended with a multilayer interlayer, two multilayer interlayers can be blended, or one multilayer interlayer can be blended into a resin layer of another multilayer interlayer. The effect arising from blending two materials can also be achieved from blending two or more resins, plasticizers, and other additives according to the contents of the materials. For the clarity of the present invention, the discussion on the blend, including blend of resins and blend of resin layers or interlayers, have been centered on the blend of resins throughout of the present invention. As used herein, a "blend resin material" or "blend material" refers to the resin composition, resin layer or interlayer to be blended into another resin composition, resin layer or interlayer. In blending two resin layers or two interlayers, at least one of the two materials to be blended can include the resin layer or interlayer of the present invention. In other embodiments, both materials can include the resin layers or interlayers of the present invention.

In some embodiments, a resin layer or interlayer can include at least a first resin layer comprising a first poly(vinyl acetal) resin and a first plasticizer, and a second resin layer comprising a second poly(vinyl acetal) resin and a second plasticizer. The first layer may be adjacent to the second layer and the first and second plasticizer can be the same or different. When one of the first and second poly(vinyl acetal) resins has a residual hydroxyl content that is at least 2 weight percent higher or lower than the residual hydroxyl content of the other, the difference in plasticizer content between the resin layers can be at least about 2, at least about 5, at least about 8, at least about 10, at least about 12, or at least about 15 phr. In some embodiments, the resin layer that includes the resin having a lower hydroxyl content can have the higher plasticizer content. In order to control or retain other properties of the resin layer or interlayer, the difference in plasticizer content between the first and second resin layers may be not more than about 100, not more than about 50, not more than about 45, not more than about 40 phr, not more than about 35, not more than about 30, not more than about 20, not more than about 15, not more than about 10, not more than about 5 phr. In other embodiments, the difference in plasticizer content between the first and second resin layers may be at least about 40, at least about 50, at least about 60, or at least about 70 phr.

According to one embodiment, one of the resin layers can have a plasticizer content of at least about 42, at least about 45, at least about 50, at least about 55, at least about 60, at least about 65 phr and/or not more than about 120, not more than about 110, not more than about 90, not more than about 85, not more than about 80, or not more than about 75 phr, or in the range of from about 50 to about 120, about 55 to about 110, about 60 to about 90, or about 65 to about 75 phr. One or more other resin layers may have a plasticizer content of less than 50 phr, not more than about 45 phr, not more than about 40 phr, not more than about 38 phr, not more than about 30 phr, or not more than about 20 phr.

In some embodiments, the first and second resin layers can exhibit different glass transition temperatures. Glass transition temperature, or $T_g$, is the temperature that marks the transition from the glassy state of the polymer to the rubbery state. The glass transition temperatures of the resins and layers described herein were determined by dynamic mechanical thermal analysis (DTMA). The DTMA measures the storage (elastic) modulus (G') in Pascals, loss (viscous) modulus (G") in Pascals, and the tan delta (G"/G') of the specimen as a function of temperature at a given oscillation frequency and temperature sweep rate. The glass transition temperature is then determined by the position of the tan delta peak on the temperature scale. Glass transition temperatures provided herein were determined at an oscillation frequency of 1 Hz under shear mode and a temperature sweep rate of 3° C./min.

The difference between the glass transition temperatures of the first resin layer and the second resin layer, or various regions of a blended resin or resin layer, can be at least about 3, at least about 5, at least about 8, at least about 10, at least about 12, at least about 15, at least about 18, at least about 20, at least about 22, or at least about 25° C. One of the first and second resins or resin layers can have a glass transition temperature of at least about 26, at least about 28, at least about 30, at least about 33, at least about 35° C. and/or not more than about 70, not more than about 65, not more than about 60, not more than about 55, not more than about 50, not more than about 45, not more than about 40, or not more than about 35° C., or a glass transition temperature in the range of from about 26 to about 70° C., about 30 to about 70° C., about 30 to about 65° C., or about 30 to about 40° C. The other of the first and second poly(vinyl acetal) resins or resin layers can have a glass transition temperature of less than 25, not more than about 20, not more than about 15, not more than about 10, not more than about 5, not more than about 0, not more than about −5, not more than about −10° C. In some embodiments, the difference between the glass transition temperatures of various regions of a blended resin of the first and second resins might be indistinguishable by the $T_g$ measurement.

When the first and second poly(vinyl acetal) resins are blended with one another such that domains of one resin are dispersed within the other, such differences in plasticizer content and/or glass transition temperature may also exist between domains of the first and second resins. For example, in some embodiments, a resin layer or interlayer may include various domains of higher or lower plasticizer content and/or domains having higher or lower glass transition temperatures, as described previously. In some embodiments, at least a portion of the resin layer or interlayer can have a glass transition temperature of at least about 25, at least about 27, at least about 30, at least about 33, at least about 35° C. and/or not more than about 70, not more than about 65, not more than about 60, not more than about 55, not more than about 50, not more than about 45, not more than about 40, or not more than about 35° C., or a glass transition temperature in the range of from about 25 to about 70° C., about 27 to about 65° C., or about 30 to about 40° C. In some embodiments, at least a portion of the resin layer or interlayer can have a glass transition temperature of less than 25, not more than about 20, not more than about 15, not more than about 10, not more than about 5, not more than about 0, not more than about −5, not more than about −10° C.

One or more resin compositions, layers, and interlayers described herein may include various other additives to impart particular properties or features to the interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

Additionally, various adhesion control agents ("ACAs") can be used in the interlayers of the present disclosure to control the adhesion of the sheet to glass. In various embodiments, the amount of ACAs present in a resin composition, layer, or interlayer can be at least about 0.003, at least about 0.01, at least about 0.025 and/or not more than about 0.15, not more than about 0.10, or not more than about 0.04 phr, or in the range of from about 0.003 to about 0.15, about 0.01 to about 0.10, or about 0.025 to about 0.04 phr. Suitable ACAs can include, but are not limited to, sodium acetate, potassium acetate, magnesium bis(2-ethyl butyrate), magnesium bis(2-ethylhexanoate), and combinations thereof, as well as the ACAs disclosed in U.S. Pat. No. 5,728,472.

Resins having different compositions and plasticized resin layers having different properties also tend to exhibit different values for certain optical properties, such as haze and visual transmittance, which can reduce the optical quality of the resulting layer or blend. However, in various embodiments of the present invention, compositions, layers, and interlayers that include at least a first poly(vinyl acetal) resin and a second poly(vinyl acetal) resin may further include at least one blending agent for increasing the compatibility of the first and second poly(vinyl acetal) resins with each other and/or for enhancing the optical properties of the composition, layer, or interlayer.

According to one embodiment, the composition, layer, or interlayer can include at least one blending agent. As used herein, the term "blending agent" refers to any agent or additive included in the composition, layer, or interlayer to facilitate blending of the components within the composition, layer, or interlayer. In some embodiments, the blending agent can include at least two chemical functional groups, or moieties, that are more compatible with some of the poly (vinyl acetal) resins as compared to others. For example, in some embodiments, the blending agent can have at least one moiety that is more compatible with the first poly(vinyl acetal) resin than with the second poly(vinyl acetal) resin and at least one other moiety that is more compatible with the second poly(vinyl acetal) resin than with the first poly (vinyl acetal) resin.

In some embodiments, the blending agent may have a hydrophilic group and a lipophilic group and, as a result, may exhibit a higher tendency to hydrogen bond with one of the two poly(vinyl acetal) resins than with the other of the poly(vinyl acetal) resins. The blending agent may also exhibit more polar-polar interactions with one of the two resins than the other of the two resins. Additionally, the blending agent may have one moiety that has a higher hydrophobic-hydrophobic interaction with one of the two resins, and it may have at least one other moiety having a higher hydrophilic-hydrophilic interaction with another of the two resins.

The blending agent may include at least one hydrophobic segment and at least one lipophilic segment and can, for example, have an hydrophobic-lipophilic balance (HLB) value of at least about 2, at least about 3, at least about 4, at least about 5, at least about 6, at least about 8 and/or not more than about 16, not more than about 15, not more than about 14, not more than about 13, not more than about 12, not more than about 10, not more than about 9, measured as described in "Polymeric Surfactants," Surfactant Science Series, v. 42, p. 221, by I. Piirma (CRC Press, 1992). The HLB value for the blending agent may be in the range of from about 2 to about 16, about 2 to about 15, about 3 to about 14, about 6 to about 9, or about 8 to about 14. In some embodiments, the blending agent may be selected from the group consisting of glycols and glycol ethers, or, it may be selected from the group consisting of polyethylene glycol alkylphenol ethers including at least 2 ethylene glycol units, monoalkyl ethylene glycol ethers, alkyl alcohols, and low molecular weight polyethylene glycols, and combinations thereof. In some embodiments, the blending agent may not include a compound selected from the group consisting of adipic acid esters, polyadipic acid esters, and combinations thereof. In some embodiments, the blending agent may include propylene glycol units or low molecular weight polypropylene glycol The blending agent may be present in the composition, layer, or interlayer in any amount suitable to increase the compatibility of the first and second resin to a desired extent. In some embodiments, the blending agent may be present in an amount sufficient to provide the composition, layer, or interlayer with the optical and/or acoustic properties discussed in detail below. In some embodiments, the blending agent may be present in the composition, layer, or interlayer in an amount sufficient that the composition, layer, or interlayer exhibits only a single glass transition temperature, rather than two distinct glass transition temperatures, as would be expected in a conventional blend of poly(vinyl acetal) resins having differing compositions as describe above.

In various embodiments, the blending agent may be present in the composition in an amount of at least about 0.25, at least about 0.5, at least about 1, at least about 1.5, at least about 2, at least about 2.5, at least about 5 weight percent and/or not more than about 50, not more than about 40, not more than about 30, not more than about 20, not more than about 15, not more than about 10, or not more than about 5 weight percent, based on the total weight of the composition, layer, or interlayer. The blending agent may be present in an amount in the range of from about 0.25 to about 60, about 0.5 to about 45, or about 1 to about 30 weight percent, based on the total weight of the composition, layer, or interlayer. The composition, layer, or interlayer may further include at least one plasticizer of a type and in an amount as described previously, or the blending agent itself may also act as a plasticizer for the composition, layer, or interlayer.

According to some embodiments, a resin layer or interlayer is provided that includes at least a first poly(vinyl acetal) resin, a second poly(vinyl acetal) resin, and at least one blending agent, present in the composition in an amount sufficient to increase the compatibility of the first and second poly(vinyl acetal) resins. The layer or interlayer can have a single glass transition temperature of at least about −15, at least about 0, at least about 5, at least about 10, at least about 15 and/or not more than about 70, not more than about 65, not more than about 60, not more than about 55, not more than about 50, not more than about 45, not more than about 40, not more than about 35, not more than about 30, not more than about 25, not more than about 20° C., measured as described previously. The glass transition temperature can be in the range of from about −10 to about 75° C., from about 0 to about 70° C., about 0 to about 50° C., about 5 to about 45° C., or about 10 to about 40° C. The layer or interlayer can optionally include at least one plasticizer along with one or more additional poly(vinyl acetal) resins or additives, as discussed previously.

In some embodiments, a multiple layer interlayer is provided that includes at least a first resin layer and a second resin layer adjacent to the first resin layer. One of the layers can include a first poly(vinyl acetal) resin and the second resin layer may include, in various embodiments, a blend of at least two poly(vinyl acetal) resins. When the second resin layer includes a blend of resins, one of the resins in the blend may have a different composition, such as a different residual hydroxyl content and/or different residual acetate content, than at least one other resin in the blend, and at least one resin in the blend may have a composition similar to the first poly(vinyl acetal) resin present in the first resin layer.

For example, in some embodiments, one of the poly(vinyl acetal) resins present in the second resin layer may have a residual hydroxyl content of at least 14 weight percent, while the other poly(vinyl acetal) resin in the second resin layer may have a residual hydroxyl content of less than 12 weight percent. The first poly(vinyl acetal) resin present in the first resin layer may also have a residual hydroxyl content of at least 14 weight percent and the residual hydroxyl content of the first poly(vinyl acetal) resin may be within about 2, within about 1, or within about 0.5 weight percent of the residual hydroxyl content of the higher hydroxyl content resin in the other resin layer.

Typically, in the absence of a blending agent, the layers and interlayer including the first and second poly(vinyl acetal) resins as described above exhibit a haze value greater than 1 percent and/or would have two or more glass transition temperatures corresponding to each of the individual resins present in the blended layer. However, according to embodiments of the present invention, the layers and interlayers described herein that include at least one blending agent exhibit blended resin layers having a single glass transition temperature and/or a low haze value. For example, layers and interlayers including a blend of first and second poly(vinyl acetal) resins can have a single glass transition temperature of not more than about 70, not more than about 65, not more than about 60, not more than about 55, not more than about 50, not more than about 45, not more than about 40, not more than about 35, not more than about 30, not more than about 25, not more than about 20, or not more than about 18° C., measured as described above, and/or a haze value of not more than about 5, not more than about 4, not more than about 3, not more than about 2, not more than about 1 percent, measured as described below.

According to some embodiments of the present invention, resin compositions, layers, and interlayers that include a blend of two or more poly(vinyl acetal) resin having different compositions and/or properties can include at least one haze reducing agent. As used herein, the term "haze reducing agent" refers to any additive or agent that reduces the haze of a composition, layer, or interlayer formed with two poly(vinyl acetal) resins having different compositions as discussed previously. Haze reducing agents according to embodiments of the present invention can include at least two different chemical groups, or moieties, one of which can have a higher affinity for one of the first and second poly(vinyl acetal) resins, and one of which can have a higher affinity for the other of the first and second poly(vinyl acetal) resins. When one of the moieties of the haze reducing agent has a higher affinity for one of the poly(vinyl acetal) resins than another, it may have a higher tendency to hydrogen bond with the resin, it may exhibit more polar-polar interactions with the resin, or it may exhibit more hydrophobic-hydrophobic or hydrophilic-hydrophilic interactions with the resins as compared to at least one of the other resins.

The haze reducing agent may be present in the resin composition, layer, or interlayer in an amount of at least about 0.25, at least about 0.5, at least about 1.0, at least about 1.5, at least about 2.0, at least about 2.5, at least about 5.0 and/or not more than about 20, not more than about 15, not more than about 12, not more than about 10, not more than about 8 weight percent, based on the total weight of the resin composition, layer, or interlayer. The haze reducing agent can be present in an amount in the range of from about 0.25 to about 20, about 0.5 to about 15, or about 1 to 12 weight percent, based on the total weight of the resin composition, layer, or interlayer.

The haze reducing agent can be non-reactive with one or both poly(vinyl acetal) resins in the composition, layer, or interlayer, and, in some embodiments, may be an aromatic haze reducing agent. In some embodiments, the haze reducing agent can include at least one ester moiety and at least one aliphatic moiety, each of which may have higher affinity for one of the two poly(vinyl acetal) resins than for the other. Examples of suitable haze reducing agent can include, for example, one or more compounds represented by formulas (I) through (III), below:

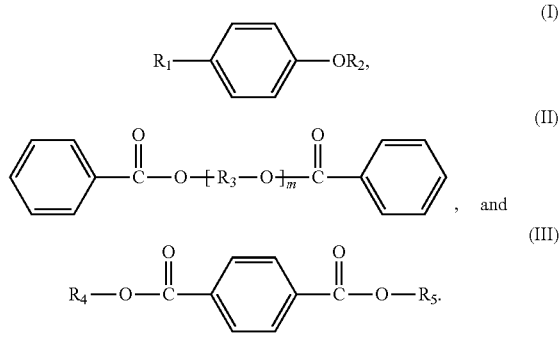

In formula (I), above, $R_1$ can be an aliphatic hydrocarbon group having at least about 4, at least about 5, at least about 6, at least about 8 and/or not more than about 50, not more than about 40, not more than about 30, not more than about 25 carbon atoms, or it can have between 4 and 50 carbon atoms, between 4 and 40 carbon atoms, or between 4 and 30 carbon atoms. In some embodiments, $R_1$ can be an aliphatic hydrocarbon group having between 8 and 25 carbon atoms. $R_1$ can be a straight chain or branched hydrocarbon group and may or may not include additional substituents such as halogens or other components. $R_2$ can be a poly(alkylene glycol) group that can include at least 1, at least 2, at least 3, at least 4, at least 5, at least 6, or at least 8 repeating units.

In formula (II), $R_3$ can be a straight chain or branched aliphatic hydrocarbon group having at least 2, at least 3, at least 4, at least 5, or at least 8 carbon atoms, and m can be at least 1, at least 2, at least 3, or at least 4. $R_3$ may be non-cyclic.

In formula (III), $R_4$ and $R_5$ can be the same or different, and may each include at least 2, at least 3, at least 4, at least 6, or at least 8 carbon atoms. The combined number of carbon atoms in $R_4$ and $R_5$ can be at least 8, at least 10, or at least 12.

Examples of suitable haze reducing agent can include, but are not limited to, nonylphenol ethoxylates having at least 1, at least 2, at least 4, at least 6, at least 8, or at least 10 repeating ethylene glycol units.

Resin compositions, layers, and interlayers formulated according to various embodiments of the present invention that include at least two poly(vinyl acetal) resins and a blending agent or a haze reducing agent may exhibit enhanced optical properties. For example, the compositions, layers, and interlayers described herein may have a higher clarity, lower haze, and/or lower mottle than compositions, layers, and interlayers formulated in the absence of the blending or haze reducing agents.

Clarity can be used to describe the composition, layer, or interlayer disclosed herein. Clarity is determined by measuring the haze value or percent haze. The test for percent haze is performed with a hazemeter, such as Model D25 available from Hunter Associates (Reston, Va.), and in accordance with ASTM D1003-13, Procedure B using Illuminant C, at an observer angle of 2 degrees. The polymer interlayers are laminated with a pair of clear glass sheets each of 2.3 mm thick (commercially available from Pittsburgh Glass Works of Pennsylvania).

The clarity of a composition, layer, or interlayer is related to its haze value. Haze value represents a quantification of light scattered by a sample as compared to the incident light. In some embodiments, the haze value of a sample may be low, such as, for example, less than 2 percent, however, when a bright light is shone on the laminates from behind, an optical defect appearing as a "milky haze," can be seen when the laminates are viewed at wide angles (>30°). The presence or absence of such a "milky haze" is characterized herein by the HLD haze value. HLD haze is measured by a HLD haze measurement apparatus, which is constructed with a tungsten halogen light source, a sample holder, a goniometer with a light detector mounted on. The HLD haze measurement apparatus is calibrated using a set of HLD standard laminates having a total thickness of 8.3 mm (5 layers of 0.76 mm interlayer) between two 2.3-mm clear glass sheets representing HLD Haze grades 0, 1, 2, and the like, with increasing values indicating increased HLD haze. In this measurement, laminate was made with clear glass having thickness of about 2.3 mm by normal autoclave lamination process. After the autoclave, the laminate was placed at room temperature overnight. The scatted light intensity at a scatted angle of 45° is collected from a testing laminate sample at room temperature using the HLD haze measurement apparatus, and HLD haze is calculated using a computer software and reported at a nominal total laminate thickness.

In some embodiments, the resin blends, layers, and interlayers described herein may have an HLD value of less than 5, less than about 4, less than about 3, less than about 2, less than about 1, or less than about 0.5. According to some embodiments, the compositions, layers, and interlayers including a haze reducing agent or blending agent as described herein may exhibit an HLD haze value that is at least about 1, at least about 2, at least about 5, at least about 8, at least about 10 and/or not more than about 50, not more than about 30, not more than about 25, not more than about 20 percent lower than the HLD haze value of an identical composition, layer, or interlayer formulated in the absence of the blending agent or haze reducing agent. The HLD haze value can be in the range of from about 1 to about 50, about 2 to about 30, or about 10 to about 20 percent lower than the HLD haze value of an identical composition, layer, or interlayer formulated in the absence of the blending agent or haze reducing agent.

As used herein, the term "identical" used with reference to a composition, layer, or interlayer refers to a composition, layer, or interlayer formulated with identical poly(vinyl acetal) resin, having the same type and amount of aldehyde residues and the same residual hydroxyl and acetate contents, and present in the same amounts as a given composition, layer, or interlayer. When the composition, layer, or interlayer includes a plasticizer, an "identical" resin composition, layer, or interlayer includes a plasticizer of the same type and in the same amount as the specified composition, layer, or interlayer.

In some embodiments, as discussed above, at least a portion of the resin layer or interlayer may have a glass transition temperature of less than 25, not more than about 20, not more than about 15, not more than about 10, not more than about 5, not more than about 2, not more than about 1, not more than about 0, not more than about −5, not more than about −10° C., not more than about −15° C., which may facilitate its improved acoustic performance. At the same time, at least a portion of the layer or interlayer may have a glass transition temperature of at least about 26, at least about 30, at least about 35, at least about 40, at least about 45° C., which may facilitate impact resistance properties and strength. As discussed previously, blends of polyvinyl acetal resins having different compositions, but including a blending agent may exhibit a single glass transition temperature that falls within one or more of the ranges provided above.

Additionally, the resin layers and interlayers can have a damping loss factor of at least about 0.10, at least about 0.15, at least about 0.17, at least about 0.20, at least about 0.25, at least about 0.27, at least about 0.30, at least about 0.33, or at least about 0.35. Loss factor was measured by Mechanical Impedance Measurement as described in ISO Standard 16940. A polymer sample was laminated between two sheets of clear glass, each having a thickness of 2.3 mm, and was prepared to have a width of 25 mm and a length of 300 mm. The laminated sample was then excited at the center point using a vibration shaker, commercially available from Brüel and Kjær (Nærum, Netherlands) and an impedance head was used to measure the force required to excite the bar to vibrate and the velocity of the vibration. The resultant transfer function was recorded on a National Instrument data acquisition and analysis system and the loss factor at the first vibration mode was calculated using the half power method. The resin compositions, layers, and interlayers described above may be produced according to any suitable method. In various embodiments, the method for producing these compositions, layers, and interlayers can include providing two or more poly(vinyl acetal) resins, blending the resins with at least one blending agent and/or at least one haze reducing agent and, optionally, at least one plasticizer or other additive, to form a blended composition, and forming a layer from the blended composition.

In some embodiments, the resins provided in the initial steps of the method can be in the form of one or more poly(vinyl acetal) resins. The step of blending of the two resins can comprise melt blending and may be performed at a temperature of at least about 100, at least about 150, at least about 200° C. Additionally, a portion of the blending step can include blending one or more of the resins with at least one plasticizer and/or with one or more of the blending agents or haze reducing agents described previously. The step of blending of two blend materials can be done similar to the blending of the two resins.

The resulting blended resins can then be formed into one or more resin layers or interlayers according to any suitable method. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, including one or more blending or haze reducing agents as described previously, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of the layers or interlayers can be at least about 10, at least about 15, at least about 20 mils and/or not more than about 100, not more than about 90, not more than about 60, not more than about 50, or not more than about 35 mils, or it can be in the range of from about 10 to about 100, about 15 to about 60, or about 20 to about 35 mils. In millimeters, the thickness of the polymer layers or interlayers can be at least about 0.25, at least about 0.38, at least about 0.51 mm and/or not more than about 2.54, not more than about 2.29, not more than about 1.52, or not more than about 0.89 mm, or in the range of from about 0.25 to about 2.54 mm, about 0.38 to about 1.52 mm, or about 0.51 to about 0.89 mm. In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other.

In some embodiments of the present invention, the resin composition, layer, or interlayer can include at least one recycled resin material. As used herein, the term "recycled material" refers to a resin layer or interlayer that has been removed from and subsequently returned to the same or a different production line. In some embodiments, the resin composition, layer, or interlayer can include at least one reworked material. As used herein, the term "reworked material" refers to a resin layer or resin interlayer that has been removed from and subsequently returned to the same production line. When the type and/or amount of resins and plasticizers being recycled or reworked differs from those in the poly(vinyl acetal) resin being produced, the optical characteristics, such as clarity and haze, of the resulting resin composition, layer, or interlayer can be adversely impacted. However, use of a haze reducing or blending agent as described above may result in layers or interlayers including recycled or reworked materials, but having improved optical properties. It should be understood that the type and/or amount of recycled or reworked resin material used in layers and interlayers in various embodiments of the present invention may fall within one or more of the ranges described previously and the layer or interlayer may further include at least one haze reducing agent and/or at least one blending agent as described herein.

The resin compositions, layers, and interlayers according to embodiments of the present invention may be utilized in a multiple layer panel that comprises a resin layer or interlayer and at least one rigid substrate. Any suitable rigid substrate may be used and in some embodiments may be selected from the group consisting of glass, polycarbonate, acrylic, and combinations thereof. In some embodiments, the multilayer panels include a pair of rigid substrates with the resin interlayer disposed therebetween. The panels can be used for a variety of end use applications, including, for example, for automotive windshields and windows, aircraft windshields and windows, structural architectural panels, decorative architectural panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to some embodiments in steps (2) through (5) above include vacuum bag and vacuum ring processes, and both may also be used to form interlayers of the present invention as described herein.

In some embodiments, the multiple layer panel may include at least one polymer film disposed on the layer or interlayer, forming a multiple layer panel referred to as a "bilayer." In some embodiments, the interlayer utilized in a bilayer may include a multilayer interlayer, while, in other embodiments, a monolithic interlayer may be used. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film can also be thinner than the sheet, and may have a thickness in the range of from 0.001 to 0.25 mm. Poly(ethylene terephthalate) ("PET") can be one example of a material used to form the polymer film in a bilayer.

The following examples are intended to be illustrative of the present invention in order to teach one of ordinary skill in the art to make and use the invention and are not intended to limit the scope of the invention in any way.

EXAMPLES

The following Examples describe the preparation of several resin compositions, layers, and interlayers that include blends of two or more poly(vinyl acetal) resins having different compositions, some of which further included at least one blending agent or haze reducing agent. As described below, several tests performed on many of the compositions, layers, and interlayers were used to evaluate the acoustic and optical properties of several comparative and disclosed materials.

Example 1

Preparation of Poly(vinyl acetal) Resin Layers

Comparative Resin Layer, CL-1 and CL-2, were prepared by combining one or more of polyvinyl n-butyral resins having different residual hydroxyl contents in amounts as shown in Table 1, below. The first polyvinyl butyral resin (PVB-1) has a residual hydroxyl content of about 19 weight percent and a residual acetate content of about 2 weight percent. The second polyvinyl butyral resin (PVB-2) had a residual hydroxyl content of about 13.3 weight percent and a residual acetate content of about 2 weight percent. Each resin layer also included the plasticizer tri-ethylene glycol-bis-2-ethylhexanoate (3GEH), which was present in each layer in the amount shown in Table 1. The mixture of resin and plasticizer was melt mixed in a Braebender mixer at a temperature of 170° C. for 7 minutes and the resulting melt was pressed into sheets having a thickness of 0.76 mm. The glass transition temperature of the sheet was measured and the results are provided in Table 1, below.

The Disclosed Resin Layers, DL-1 through DL-7, were prepared in a similar manner as Comparative Resin Layers CL-1 and CL-2 described above, but included 25 parts by weight of the first resin (PVB-1) and 25 parts by weight of the second resin (PVB-2), and varying amount of 3GEH and blending agent. Disclosed Resin Layers DL-1 through DL-7 included various types and amounts of blending agents, each of which included nonylphenol polyethylene glycol having a different number of mole units of ethylene glycol. Blending Agent A included 4 mole units of ethylene glycol, Blending Agent B included 6 mole units of ethylene glycol, and Blending agent C included 10 mole units of ethylene glycol. Blending agents A, B, and C are commercially available as SURFONIC® N-40, N-60, and N-102, respectively, from Huntsman Chemical Company, The Woodlands, Tex. The blending agents were mixed with the resins in the amounts shown in Table 1. Each of the resulting blended melt mixtures was pressed into a sheet having a thickness of 0.76 mm, and the glass transition temperature and haze of the sheet were determined as described above. The results are provided in Table 1, below.

TABLE 1

Glass Transition Temperatures and Haze for Several PVB Resin Sheets

| PVB Sheet Layer | PVB-1 (parts) | PVB-2 (parts) | 3GEH (parts) | Blending Agent A (grams) | Blending Agent B (grams) | Blending Agent C (grams) | $T_g$-1 (°C.) | $T_g$-2 (°C.) | Haze per ASTM D1003 (%) |
|---|---|---|---|---|---|---|---|---|---|
| CL-1 | — | 50 | 25 | — | — | — | nd | 16.9 | 0.6 |
| CL-2 | 25 | 25 | 25 | — | — | — | 12.3 | 32.5 | 61.3 |
| DL-1 | 25 | 25 | 15 | — | 10 | — | 17.6 | nd | 19.3 |
| DL-2 | 25 | 25 | 12.5 | — | 12.5 | — | 18.8 | nd | 13.2 |
| DL-3 | 25 | 25 | — | — | 25 | — | 27.4 | nd | 4.8 |
| DL-4 | 25 | 25 | 12.5 | 12.5 | — | — | 16.1 | nd | 12.5 |
| DL-5 | 25 | 25 | — | 25 | — | — | 21.3 | nd | 2.3 |
| DL-6 | 25 | 25 | 12.5 | — | — | 12.5 | 19.5 | nd | 4.3 |
| DL-7 | 25 | 25 | — | — | — | 25 | 23.4 | nd | 2.6 | nd = not determined

As shown in Table 1, above, the sheet formed from Comparative Resin Layer CL-2 exhibited two distinct glass transition temperatures, which indicates that PVB1 and PVB2 formed a phase-separated blend within that layer, and a high level of haze. However, as shown in Table 1, addition of Blending Agents A, B, or C in Disclosed Resins DL-1 to DL-7 facilitated blending of the two resins, PVB-1 and PVB-2, to form a compatible resin blend that exhibited a single glass transition temperature and significantly reduced haze level. Additionally, as shown by Disclosed Resin Layer DL-1, DL-2, DL-4, and DL-6, an additional plasticizer, such as 3GEH, can be used with these blends, but, as shown by Disclosed Resin Layers DL-3, DL-5, and DL-7, it is not required. However, when an additional plasticizer was included, the blend exhibited a lower glass transition temperature, as shown by comparison of DL-1, DL-2, DL-4, or DL-6 in Table 1.

Additional Comparative Resin Layers CL-3 and CL-4 and Disclosed Resin Layers DL-8 through DL-13 were prepared in a similar manner as described above. The first polyvinyl butyral resin, PVB-3, used in each of Comparative Resin Layers CL-3 and CL-4 and Disclosed Resin Layers DL-1 through DL-7, had a residual hydroxyl content of about 21 weight percent and a residual acetate content of about 2 weight percent. The second poly(vinyl n-butyral) resin (PVB-4) had a residual hydroxyl content of about 11 weight percent and a residual acetate content of about 2 weight percent. Each of Disclosed Resin Layers D-8 through D-13 were prepared with at least one Blending Agent A, B, and C, as described above. The composition of each of Comparative Resin Layers CL-3 and CL-4 and Disclosed Resin Layers DL-8 through DL-13 are summarized in Table 2, below. The glass transition temperature, haze, and damping loss factor for each of Comparative Resin Layers CL-3 and CL-4 were measured as discussed above, and the results are summarized in Table 2, below.

TABLE 2

Glass Transition Temperatures and Haze for Several Additional PVB Resin Sheets

| Sample | PVB-3 (parts) | PVB-4 (parts) | 3GEH (parts) | Blending Agent A (grams) | Blending Agent B (grams) | Blending Agent C (grams) | $T_g$-1 (°C.) | $T_g$-2 (°C.) | Haze per ASTM D1003 (%) | Loss Factor ($\eta$) |
|---|---|---|---|---|---|---|---|---|---|---|
| CL-3 | 30 | 20 | 26 | — | — | — | −4 | 35 | 94 | 0.13 |
| CL-4 | 20 | 30 | 30 | — | — | — | −4 | 35 | 93 | 0.37 |
| DL-8 | 30 | 20 | — | 26 | — | — | 21.2 | N.A | 10.3 | 0.32 |
| DL-9 | 20 | 30 | — | 30 | — | — | 15.7 | N.A | 12.2 | 0.76 |
| DL-10 | 30 | 20 | — | — | 26 | — | 22.7 | N.A | 6.7 | 0.43 |
| DL-11 | 20 | 30 | — | — | 30 | — | 15.2 | N.A | 9 | 0.72 |
| DL-12 | 30 | 20 | — | — | — | 26 | 26.9 | N.A | 7.5 | 0.12 |
| DL-13 | 20 | 30 | — | — | — | 30 | 16.7 | N.A | 8.6 | 0.37 |

As shown in Table 2, above, the sheets formed from Comparative Resin Layers CL-3 and CL-4 each exhibited two distinct glass transition temperatures, which indicates that PVB-3 and PVB-4 in each of the sheets formed a phase-separated blend within the layer, which resulted in a high level of haze. However, as shown in Table 2, addition of one of Blending Agents A, B, or C in Disclosed Resins DL-8 to DL-13 facilitated blending of the two resins, PVB-3 and PVB-4, into a resin blend that exhibited a single glass transition temperature and a significantly reduced haze level. The addition of a blending agent also did not affect the damping loss factor of the layers resulting from the blend of PVB-3 and PVB-4, and in some cases, lead to an increase in the damping loss factor, as shown in Table 2, as compared to resin layers that did not include a blending agent. For example, Disclosed Resin Layers DL-9 and DL-11 exhibited a damping loss factor of 0.76 and 0.72, respectively, which are considerably higher than that of Comparative Resin Layer CL-4, which was 0.37. Additionally, as shown above, Disclosed Resin Layers DL-8 and DL-10 had damping loss factors of 0.32 and 0.43, respectively, which were also higher than that of Comparative Resin Layer CL-3, which was 0.13. As discussed previously and as shown in Table 2, the blending agent, when properly selected, may not only facilitate blending between two different resins, but may also improve sound insulation, as measured by increased damping loss factor.

Disclosed Resin Layers DL-14 through DL-20 were prepared in a similar fashion as the resin layers discussed above with respect to Table 1. The first and second polyvinyl butyral resins, PVB-3 and PVB-4, were the same resins used to form the resin layers summarized in Table 2. Several of the Disclosed Resin Layers included Blending Agent A, as described above, and several of the Resin Layers further included at least one haze reducing agent. Haze Reducing Agent A was a propylene glycol dibenzoate and Haze Reducing Agent B was a diethylene glycol dibenzoate, both of which are commercially available as Benzoflex™ 284 and Benzoflex™ 2-45, both commercially available from Eastman Chemical Company, Kingsport, Tenn. The composition of each of Disclosed Resin Layers DL-14 through DL-20 are summarized in Table 3, below, along with the haze of each resin layer, measured as described above.

a plasticizer. Some resin blends included 1.4 weight percent of PVB-4, while others included 2.8 weight percent PVB-4, based on the total combined weight of the resins.

Several resin compositions were then formed by combining several of the resin blends with various amounts of one of the following blending or haze reducing agents: bis(2-ethylhexyl) terephthalate, commercially available as Eastman 168™ from Eastman Chemical Company, Kingsport, Tenn. (Haze Reducing Agent H-1); a benzoate ester, commercially available as Benzoflex™ 9-88 from Eastman Chemical Company (Haze Reducing Agent H-2); nonylphenol 12-mole ethoxylate, commercially available as SURFONIC® N-102 from Huntsman Chemical Company, The Woodlands, Tex. (Blending Agent B-1); poly(propylene glycol) dibenzoate, commercially available as UNIPLEX 400 from Unitex Chemical Company, Greensboro, N.C.

TABLE 3

Haze Values for Several Additional PVB Resin Sheets

| Sample | PVB-3 (parts) | PVB-4 (parts) | Blending Agent A (parts) | Haze Reducing Agent A (parts) | Haze Reducing Agent B (parts) | Haze per ASTM D1003 (%) |
|---|---|---|---|---|---|---|
| DL-14 | 25 | 25 | 25 | — | — | 11 |
| DL-15 | 25 | 25 | 10 | 15 | — | 3.6 |
| DL-16 | 25 | 25 | 13 | 12.5 | — | 5.1 |
| DL-17 | 25 | 25 | 15 | 10 | — | 7.1 |
| DL-18 | 25 | 25 | 10 | — | 15 | 1.4 |
| DL-19 | 25 | 25 | 13 | — | 12.5 | 3.0 |
| DL-20 | 25 | 25 | 15 | — | 10 | 4 |

As shown in Table 3, use of a haze reducing agent, such as Haze Reducing Agent A or B, further reduced the haze of the resin blends that included a blending agent. In addition, increasing the amount of haze reducing agent in the resin layers affords additional reduction in haze of the resin layer that included a blend of two distinctive resin composition.

Example 2

Resin Layers Including Various PVB Blends

Several blends of polyvinyl n-butyral resins (PVB) of varying hydroxyl contents were formed in order to simulate blends of resins having a lower residual hydroxyl content with resins having a higher residual hydroxyl content. For this example, each resin blend included a poly(vinyl n-butyral) resin (PVB-1) and another poly(vinyl n-butyral) resin having a residual hydroxyl content of 11 weight percent and a residual acetate content of about 2 weight percent (PVB-4). Each blend also included varying amounts of 3GEH as (Haze Reducing Agent H-3); and nonylphenol hexaethoxylate, commercially available as SURFONIC® N-60 also from Huntsman Chemical Company (Blending Agent B-2).

Each composition was then melt mixed in a Braebender mixer at a temperature of 170° C. for 7 minutes and the resulting melt was pressed into a sheet having a thickness of about 0.76 mm in order to form Disclosed Resin Layers DL-14 through DL-33. The glass transition temperatures of some of the sheets were measured and are provided in Table 4, below. Each sheet was formed into a laminate using a pair of clear glass plates having a thickness of 2.3 mm at standard nip roll lamination conditions. The HLD haze value of each laminate was measured as described above and the results are also summarized in Table 4, below. Table 4 also provides the percent reduction in haze exhibited by each Disclosed Resin sheet as compared to with the haze value of a Comparative Resin Sheet (CR-5 or CR-6) formulated with either 1.4 weight percent (PVB-4) or 2.8 weight percent (PVB-4), but without a haze reducing agent.

TABLE 4

Properties of Various Resin Blends

| Resin Sheet | Resin Blend Composition | | | | | | | | PVB3 (wt % of resins) | Haze Reducing Agent (wt % of blend) | $T_g$ (° C.) | HLD Haze | Haze Reduction (%) |
|---|---|---|---|---|---|---|---|---|---|---|---|---|---|
| | PVB4 (g) | PVB1 (g) | 3GEH (g) | Haze Reducing or Blending Agent (g) | | | | | | | | | |
| | | | | H-1 | H-2 | B-1 | H-3 | B-2 | | | | | |
| CL-5 | 1.4 | 48.6 | 19.5 | — | — | — | — | — | 2.8% | 0.0% | 30.9 | 2.30 | — |
| DL-14 | 1.4 | 48.6 | 17.0 | 2.5 | — | — | — | — | 2.8% | 3.6% | 31.7 | 1.70 | 26.1% |
| DL-15 | 1.4 | 48.6 | 14.5 | 5 | — | — | — | — | 2.8% | 7.2% | 33.1 | 1.20 | 47.8% |
| DL-16 | 1.4 | 48.6 | 17.0 | — | 2.5 | — | — | — | 2.8% | 3.6% | 30.5 | 0.80 | 65.2% |

TABLE 4-continued

Properties of Various Resin Blends

| Resin Sheet | Resin Blend Composition | | | | | | | | PVB3 (wt % of resins) | Haze Reducing Agent (wt % of blend) | $T_g$ (°C.) | HLD Haze | Haze Reduction (%) |
|---|---|---|---|---|---|---|---|---|---|---|---|---|---|
| | PVB4 (g) | PVB1 (g) | 3GEH (g) | Haze Reducing or Blending Agent (g) | | | | | | | | | |
| | | | | H-1 | H-2 | B-1 | H-3 | B-2 | | | | | |
| DL-17 | 1.4 | 48.6 | 14.5 | — | 5 | — | — | — | 2.8% | 7.2% | 30.5 | 0.50 | 78.3% |
| DL-18 | 1.4 | 48.6 | 17.0 | — | — | 2.5 | — | — | 2.8% | 3.6% | 30.0 | 0.60 | 73.9% |
| DL-19 | 1.4 | 48.6 | 14.5 | — | 5 | — | — | — | 2.8% | 7.2% | 29.4 | 1.20 | 47.8% |
| DL-20 | 1.4 | 48.6 | 17.0 | — | — | — | 2.5 | — | 2.8% | 3.6% | 30.8 | 1.60 | 30.4% |
| DL-21 | 1.4 | 48.6 | 14.5 | — | — | — | 5 | — | 2.8% | 7.2% | 31.5 | 1.20 | 47.8% |
| DL-22 | 1.4 | 48.6 | 17.0 | — | — | 2.5 | — | — | 2.8% | 3.6% | nd | 2.01 | 12.7% |
| DL-23 | 1.4 | 48.6 | 18.0 | — | — | 1.5 | — | — | 2.8% | 2.2% | nd | 1.22 | 46.8% |
| DL-24 | 1.4 | 48.6 | 18.5 | — | — | 1 | — | — | 2.8% | 1.4% | nd | 1.54 | 32.9% |
| DL-25 | 1.4 | 48.6 | 17.0 | — | — | — | — | 2.5 | 2.8% | 3.6% | nd | 0.92 | 60.0% |
| DL-26 | 1.4 | 48.6 | 18.0 | — | — | — | — | 1.5 | 2.8% | 2.2% | nd | 0.76 | 67.0% |
| CL-6 | 0.7 | 49.3 | 19.0 | — | — | — | — | — | 1.4% | 0.0% | nd | 0.48 | — |
| DL-27 | 0.7 | 49.3 | 16.5 | — | — | 2.5 | — | — | 1.4% | 3.6% | nd | 0.23 | 51.7% |
| DL-28 | 0.7 | 49.3 | 17.5 | — | — | 1.5 | — | — | 1.4% | 2.2% | nd | 0.43 | 10.0% |
| DL-29 | 0.7 | 49.3 | 18.0 | — | — | 1 | — | — | 1.4% | 1.4% | nd | 0.44 | 8.3% |
| DL-30 | 0.7 | 49.3 | 16.5 | — | 2.5 | — | — | — | 1.4% | 3.6% | nd | 0.42 | 11.7% |
| DL-31 | 0.7 | 49.3 | 17.5 | — | 1.5 | — | — | — | 1.4% | 2.2% | nd | 0.34 | 28.3% |
| DL-32 | 0.7 | 49.3 | 17.5 | — | — | — | — | 2.5 | 1.4% | 3.6% | nd | 0.38 | 21.7% |
| DL-33 | 0.7 | 49.3 | 16.5 | — | — | — | — | 1.5 | 1.4% | 2.2% | nd | 0.43 | 10.0% | nd = not determined

As shown in Table 4, above, the Disclosed Resin blends that included a haze reducing agent or a blending agent exhibited lower haze values than similar Comparative Resin blends that did not include such agents. Additionally, as shown in Table 4, Haze Reducing Agents H-1 through H-3 and Blending Agents B-1 and B-2 were effective to reduce the haze of compositions that included varying amounts of PVB-4, which had lower residual hydroxyl content. Surprisingly, some blends having a higher PVB-4 concentration actually demonstrated increased haze reduction, as compared to those having a lower concentration of PVB-3.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. An interlayer comprising:
   a resin layer comprising—
      a first poly(vinyl acetal) resin;
      a second poly(vinyl acetal) resin, wherein said second poly(vinyl acetal) resin is present in said resin layer in an amount of at least 0.3 weight percent, based on the combined weight of said first and said second poly(vinyl acetal) resins; and
      a haze reducing agent,
   wherein said resin layer has an HLD haze value that is at least 5 percent lower than the HLD haze value of an identical resin layer that does not include said haze reducing agent.

2. The interlayer of claim 1, wherein said haze reducing agent is present in said resin layer in an amount of at least 0.25 weight percent, based on the total weight of said resin layer.

3. The interlayer of claim 1, wherein said haze reducing agent is selected from the group consisting of the compounds represented by formulas (I) through (III), below—

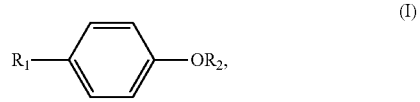

(I)

wherein $R_1$ is a aliphatic hydrocarbon group having between 4 and 50 carbon atoms, and wherein $R_2$ is a poly(alkylene glycol) group includes at least 2 alkylene glycol repeat units;

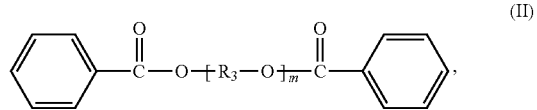

(II)

wherein R₃ is a branched or straight chain aliphatic hydrocarbon group having at least 2 carbon atoms, and wherein m is at least 1; and

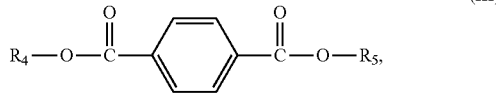
(III)

wherein R₄ and R₅ are the same or different hydrocarbon groups, each comprising at least 2 carbon atoms and wherein the total number of carbon atoms in R₄ and R₅ is at least 8.

4. The interlayer of claim 1, wherein said first poly(vinyl acetal) resin has a residual hydroxyl content that is at least 2 weight percent higher or lower than the residual hydroxyl content of said second poly(vinyl acetal) resin and/or wherein said first poly(vinyl acetal) resin has a residual acetate content that is at least 2 weight percent higher or lower than the residual acetate content of said second polyvinyl resin.

5. The interlayer of claim 1, further comprising a third poly(vinyl acetal) resin, wherein said first, second, and third poly(vinyl acetal) resin are each present in said resin layer in an amount of at least 0.3 weight percent, based on the total weight of said first, second, and third poly(vinyl acetal) resins.

6. The interlayer of claim 1, wherein said resin layer further comprises at least one plasticizer present in said resin layer in an amount of less than 95 phr and wherein at least a portion of said resin layer has a glass transition temperature of at least 26° C.

7. The interlayer of claim 1, wherein at least a portion of said resin layer as a glass transition temperature of less than 25° C.

* * * * *